US00RE40193E

(19) United States
(12) Reissued Patent
Boehlow

(10) Patent Number: US RE40,193 E
(45) Date of Reissued Patent: Apr. 1, 2008

(54) KEYLESS DEADBOLT LOCK ENGAGING DEVICE

(75) Inventor: Robert D. Boehlow, Herculaneum, MO (US)

(73) Assignee: Safety By Design LLC, Chesterfield, MO (US)

(21) Appl. No.: 11/197,725

(22) Filed: Aug. 4, 2005

Related U.S. Patent Documents

Reissue of:
(64) Patent No.: 6,601,420
Issued: Aug. 5, 2003
Appl. No.: 09/162,562
Filed: Sep. 29, 1998

U.S. Applications:
(63) Continuation of application No. 08/742,133, filed on Oct. 31, 1996, now Pat. No. 5,813,261.
(60) Provisional application No. 60/007,104, filed on Oct. 31, 1995.

(51) Int. Cl.
*E05B 9/10* (2006.01)

(52) U.S. Cl. ..... 70/379 R; 70/190; 70/224; 70/381

(58) Field of Classification Search ..... 70/379–381, 70/129.153, 190, 224, DIG. 31, DIG. 36; 292/347, 356, 357
See application file for complete search history.

(56) References Cited

U.S. PATENT DOCUMENTS

| | | | |
|---|---|---|---|
| 1,048,628 | A | 12/1912 | Woolsey |
| 2,074,244 | A | 3/1937 | Thurber |
| 2,188,149 | A | 1/1940 | Kaiser |
| 3,025,694 | A | 3/1962 | George |
| 3,584,484 | A | 6/1971 | Hallmann et al. |
| 3,593,548 | A | 7/1971 | Kindrick |
| 3,779,052 | A | 12/1973 | Deitch |
| 3,881,331 | A | 5/1975 | Tranberg et al. |
| 3,896,644 | A | 7/1975 | Nagy et al. |
| 3,896,645 | A | 7/1975 | Nagy et al. |
| 3,990,277 | A | 11/1976 | Mullich |
| 4,038,846 | A | 8/1977 | Klann |
| 4,073,527 | A | 2/1978 | Schlage |
| 4,148,092 | A | 4/1979 | Martin |
| 4,169,616 | A | 10/1979 | Peterson |
| 4,236,396 | A | 12/1980 | Surko, Jr. et al. |
| 4,290,282 | A | 9/1981 | Wildenradt |
| 4,297,862 | A | 11/1981 | Solovieff |
| 4,300,374 | A | 11/1981 | Mullich et al. |
| 4,306,466 | A | 12/1981 | Coveney |
| 4,414,828 | A | 11/1983 | Takinami et al. |
| 4,631,944 | A | 12/1986 | Gater et al. |
| 4,690,073 | A | 9/1987 | Shoop |
| 4,709,566 | A | 12/1987 | Wildenradt |
| 4,712,396 | A | 12/1987 | Cary et al. |
| 4,739,639 | A | 4/1988 | Balasingam |
| 4,745,784 | A | 5/1988 | Gartner |

(Continued)

FOREIGN PATENT DOCUMENTS

WO WO 03/078767 A1 9/2003

*Primary Examiner*—Suzanne Dino Barrett
(74) *Attorney, Agent, or Firm*—Armstrong Teasdale, LLP

(57) ABSTRACT

A device allowing engagement of a conventional keyed deadbolt lock tumbler assembly without use of a key is provided. The device is assembled around the tumbler assembly and is fitted into a standard:door lock cut-out. The device includes a rotatable ring extending substantially around the periphery of the device. At rest the rotatable ring is biased in an original starting position. Upon overcoming the bias, the rotatable ring is moved to a second engaging position. Upon release of the rotatable ring the ring is biased back to the original position, while at the same time the deadbolt remains engaged. The biasing back of the device prevents the lock from binding or jamming.

37 Claims, 10 Drawing Sheets

U.S. PATENT DOCUMENTS

| | | | |
|---|---|---|---|
| 4,798,065 | A | 1/1989 | DeForrest, Sr. |
| 4,854,143 | A | 8/1989 | Corder et al. |
| 4,866,961 | A | 9/1989 | Yang |
| 4,901,544 | A | 2/1990 | Jang |
| 4,903,512 | A | 2/1990 | Leroy et al. |
| 5,010,749 | A | 4/1991 | Lin |
| 5,039,062 | A | 8/1991 | England et al. |
| 5,040,652 | A | 8/1991 | Fish et al. |
| 5,060,991 | A | 10/1991 | Davidian et al. |
| 5,085,063 | A | 2/1992 | Van Dyke et al. |
| 5,118,152 | A | 6/1992 | Lin |
| 5,150,592 | A | 9/1992 | Lin |
| 5,152,363 | A | 10/1992 | Mertens et al. |
| 5,177,987 | A | 1/1993 | Shen |
| 5,186,030 | A | 2/1993 | Lin |
| 5,193,370 | A | 3/1993 | Norden |
| 5,199,285 | A | 4/1993 | Lin |
| 5,216,908 | A | 6/1993 | Malvy |
| 5,265,924 | A | 11/1993 | Kim |
| 5,404,734 | A | 4/1995 | Martinez |
| 5,481,890 | A | 1/1996 | Millman |
| 5,531,086 | A | 7/1996 | Bryant |
| 5,544,507 | A | 8/1996 | Lin |
| 5,617,749 | A | 4/1997 | Park |
| 5,666,833 | A | 9/1997 | Gao et al. |
| 5,722,273 | A | 3/1998 | Lin et al. |
| 5,797,286 | A | 8/1998 | Armstrong |
| 5,813,261 | A | 9/1998 | Boehlow |
| 5,813,708 | A | 9/1998 | Shen |
| 6,216,502 | B1 | 4/2001 | Cannella et al. |
| 6,286,347 | B1 | 9/2001 | Frolov |
| 6,601,420 | B1 | 8/2003 | Boehlow |
| 6,651,468 | B2 | 11/2003 | Aramburu et al. |
| 2001/0028172 | A1 | 10/2001 | Bates et al. |

KEYLESS DEADBOLT LOCK ENGAGING DEVICE

Matter enclosed in heavy brackets [ ] appears in the original patent but forms no part of this reissue specification; matter printed in italics indicates the additions made by reissue.

This is a continuation of Ser. No. 08/472,133 filed Oct. 31, 1996 now U.S. Pat. No. 5,813,261 which claims benefit of Ser. No. 60/007,104 filed Oct. 31, 1995.

BACKGROUND OF THE INVENTION

The present invention relates in general to a keyless deadbolt lock engaging device for use in combination with a conventional deadbolt lock tumbler assembly, and pertains more particularly to a keyless engaging device which is biased to return to a position in which the device does not interfere with disengagement of the deadbolt by a key. The keyless engaging device of the present invention is an improvement over known locking devices as the biasing prevents the lock from binding up and thereby making disengagement of the deadbolt difficult.

Deadbolt locks have become common because of the added security which they provide. However, deadbolts have not become as convenient as other types of locks, for example automobile door locks and tubular style entryway door locks. These types of locks can be locked from the inside while exiting, thereby making it unnecessary to have the key in hand.

Several devices have been developed in an attempt to overcome the need for a key when engaging the deadbolt. However, each prior device has included one or more of the following design problems.

One of the most serious problems with prior deadbolt engaging devices is the tendency of the device to cause "binding" of the lock. Binding of the lock assembly not only makes disengagement of the lock becomes jammed. A lock could become jammed while someone is on the opposite side of the door from the device, therefor unable to manually manipulate the mechanism free. In addition, the force necessary to overcome binding of the lock accelerates wear of the internal mechanism.

U.S. Pat. No. 3,539,548 to Kendrick discloses a lock with a rotatable exterior ring. The ring is rotated to project the deadbolt, but cannot be retracted by a reverse rotation until the deadbolt is disengaged. Upon attempting to disengage the deadbolt with a key, the user would be hampered by the rotatable ring, which would bind up the deadbolt assembly.

U.S. Pat. No. 5,010,749 to Lin is another example of a device which creates a binding effect in the lock assembly. Further, as the Lin '749 design allows the rotatable ring to move freely in either direction, the user could become confused and unsure as to whether the bolt has been fully engaged.

A similar design in U.S. Pat. No. 5,186,030 to Lin has other disadvantages in addition to lock binding. First, the device is not reversible to accommodate both right and left handed doors. Supplying duplicate mirror image parts therefore becomes necessary.

Second, the Lin '030 device would allow water to enter and be trapped within the device, leading to corrosion and/or freezing of the mechanism.

Another disadvantage of prior devices is that some designs are dependent on the projection speed imparted by the user. In these designs, the deadbolt is often not fully projected, leaving the lock easily retracted without a key.

Still another disadvantage of prior devices is the complexity of the devices. The use of a large number of intricate parts makes these devices extremely complex and difficult to assemble, expensive to manufacture, and may require specialized tools. These locks may also require extensive hole cutting on the door to be fitted with the lock and device.

Accordingly, it is an object of the present invention to provide a keyless deadbolt lock engagement device which is biased to return the device to an original position to prevent binding of the lock.

It is another object of the present invention to provide a deadbolt engaging device from being jammed by incorrect rotation, and possibly trapping a person.

It is still another object of the present invention to provide a deadbolt engaging device whose keyless operation has the same feel to the user as when using a key, without an odd or binding feeling.

It is a further object of the present invention to provide a deadbolt engaging device which will not allow moisture to become trapped within the device, thereby preventing corrosion or freezing of the mechanism.

It is still a further object of the present invention to provide a deadbolt engaging device which does not depend on the rotation or projection speed by the user, thereby assuring complete engagement of the deadbolt at each use.

It is another object of the present invention to provide a design which is less susceptible to a blow from a hammer, a twisting force from a wrench or similar tool, or drilling of the lock, thereby increasing security.

It is still another object of the present invention to provide a device which fits in the standard deadbolt door cutout.

It is a further object of the present invention to provide a device which has the basic appearance of a conventional lock.

It is still a further object of the present invention to provide a device which is of simple construction, is relatively inexpensive, and has long lasting reliability.

It is another object of the present invention is to provide a device which is obvious in its operation, requires only one handed operation, and which has a positive stop to transmit to the operator that the bolt is fully projected.

SUMMARY OF THE INVENTION

To accomplish the foregoing and other objects of this invention there is provided a keyless device for engagement of the deadbolt of a conventional lock assembly.

The device of the present invention allows simple one handed engagement of the deadbolt lock without the use of a key. The keyless engagement device is assembled around the conventional deadbolt lock tumbler assembly, and is fitted into the standard door cutout. The keyless device includes a rotatable ring extending substantially around the periphery of the device. At rest the rotatable ring is biased in an original starting position. Upon overcoming the bias, the rotatable ring is moved to a second or engaging position in which the deadbolt is projected into an engaged position. Upon release of the rotatable ring the ring is biased back to the original position, while at the same time the deadbolt remains engaged. The biasing back of the device prevents the lock from binding or jamming.

The device of the present invention accommodates doors that open in either direction, as the parts can be inserted into the lock as a whole in one of two possible directions.

These and other objects of the present invention will be better understood and appreciated from the following detailed description of the embodiments selected for purposes of illustration and shown in the accompanying drawings.

DETAILED DESCRIPTION

Figure 1:
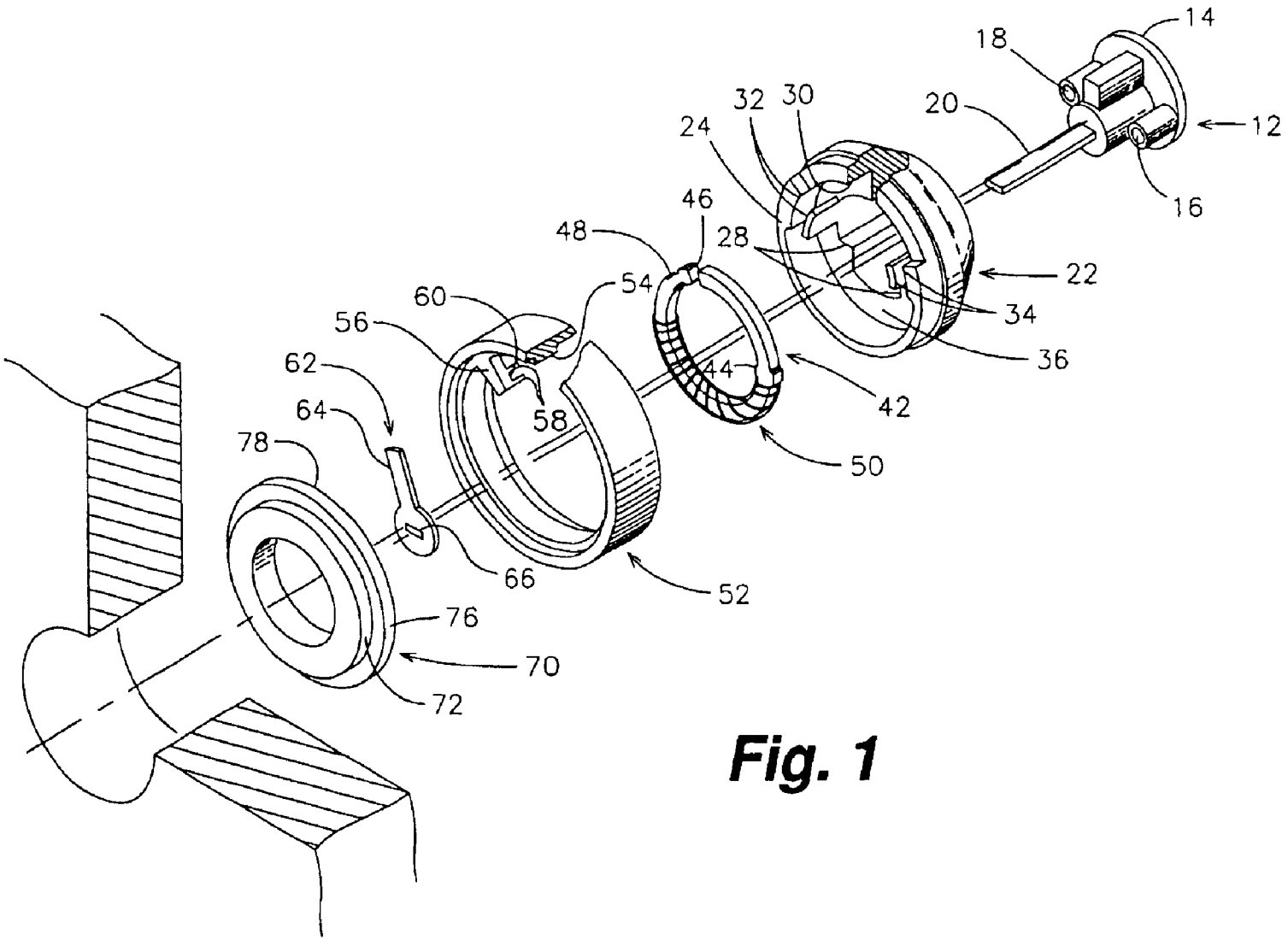
FIG. 1 is an exploded view of a preferred embodiment of the present invention. The embodiment illustrated utilizes a coiled spring and spring retaining ring as the biasing mechanism.

Referring now to the drawings there is shown a preferred embodiment for the keyless deadbolt lock engaging device of the present invention. Unless otherwise noted, the term "inside" refers to that part nearest the door when assembled, the term "outside" refers to that part furthest from the door when assembled.

The device 10 shown in FIGS. 1–5 is constructed to be assembled about a conventional deadbolt lock tumbler assembly 12 having a face plate 14, threaded holes 16, 18 and an axial actuator 20.

A body 22, preferably constructed of zinc by a die casting process, includes an aperture 26 into which the tumbler assembly 12 is inserted, and an inner surface 24. Body ring 22 further includes step projections 28 which may be integral to the body 22. Step projections 28 prevent the lock tumbler from rotating within the present invention. A channel portion 36 includes shoulder grooves 32, 34. A shoulder or rim 38 of a decreased diameter and outer ring surface 40 form bearing surfaces, shoulder 38 further including inner body surface 30.

Encased within channel 36 is a spring ring 42, preferably constructed of a nylon material by plastic injection molding, having a spring stop 44, a cut or slice 46 and a notch 48.

A return spring 50 is coiled about spring ring 42, the return spring 50 being fitted onto spring ring 42 by way of cut 46. A helical coiled compression spring illustrated in FIGS. 1–5. The return spring 50 is located between the notched portion 48 and the spring stop 44.

Figure 2:
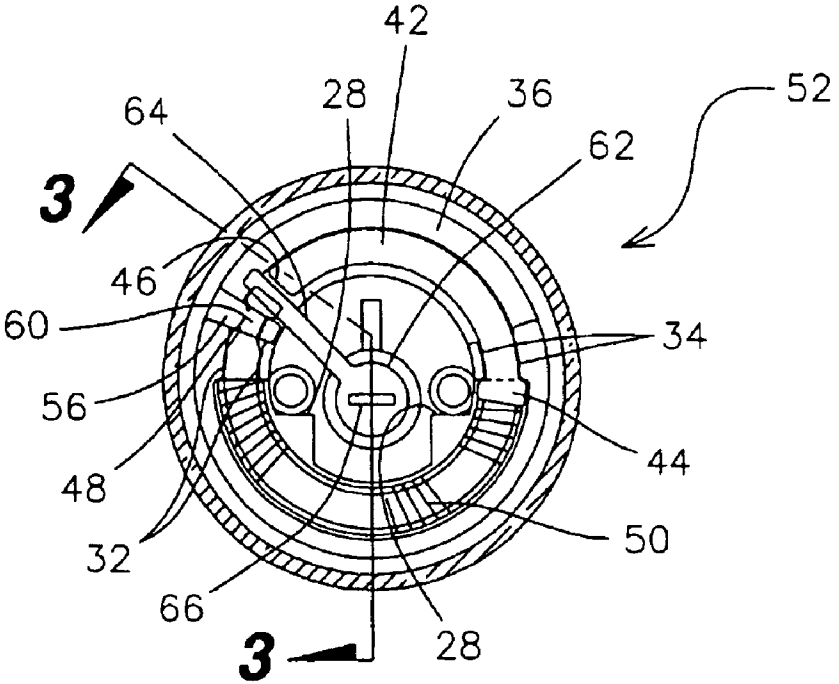
FIG. 2 is a cross sectional view along line 2—2 of the invention illustrated in FIG. 3, the device being in the deadbolt disengaged position.

The spring ring 42, return spring 50 assembly is held in position by the shoulder grooves 32, 34, as seen in FIG. 2. Return spring 50 is compressed at one end by shoulder groove 32, while the compression of the return spring 50 forces stop 44 against shoulder groove 34. Surface 30 of rim 38 provides a contact surface for the section of spring ring 42 which is not sheathed by return spring 50.

A rotatable ring 52, preferably constructed of zinc by a die casting process, includes an inwardly projecting center projection 54, which is assembled to rotate against the bearing surfaces 38, 40 of body 22. The ring 52 includes an inwardly extending radial finger 56 which is restricted axially by inner rim 38 and rotationally by grooves 32, 34. Radial finger 56 has projecting portions 58 and a catch 60 which fits notch 48 of spring ring 50.

A radial actuator 62, preferably cut from sheet steel, includes a center aperture or cutout 66 and an arm 64. The aperture 62 accepts the lock tumbler axial actuator 20. Arm 64 contacts the radial finger 56 of rotatable ring 52.

A locator ring 70, preferably constructed of zinc by a die casting process, includes a shoulder portion 72 which is accepted into the door lock hole. Outer ring surface 76 and a surface 78 act as bearing surfaces for rotatable ring 52. The surface 78 of locator ring 70 fits against inner surface 24 of the body 22. The entire assembly is clamped together with the locator ring 70 secured in the door cutout by two screws (not shown) on the door interior and tightened into two threaded holes 16, 18 of lock tumbler 12. The body 22 and locator ring 70 together sandwich loosely the rotatable ring 52, the radial actuator 62 and the spring ring 42, return spring 50 assembly.

Figure 3:
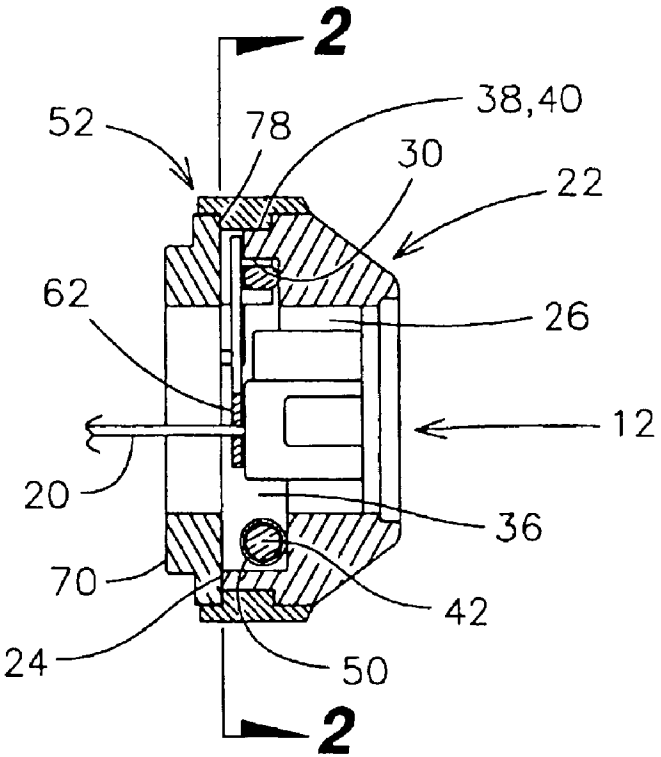
FIG. 3 is a cross sectional view along line 3—3 of the invention illustrated in FIG. 2, the device being in the deadbolt disengaged position.

FIGS. 2 and 3 illustrate the deadbolt (not shown) in the unlocked or disengaged position. Radial finger 56 rests against shoulder groove 32. The return spring 50 is under light compression and forced into an arc by spring ring 42 through its center and both are held stationary. Rotatable ring 52 is held in a stationery position as the radial finger 56 is connected to spring ring 42 by notch 48 and catch 60. The rotatable ring 52 is freely rotatable between body 22 and locator ring 70, but is constrained to rotate between shoulder grooves 32, 34 by radial finger 56. The radial actuator 62 is in contact with radial finger 56, and is also shown in the bolt retracted or disengaged position.

Figure 5:
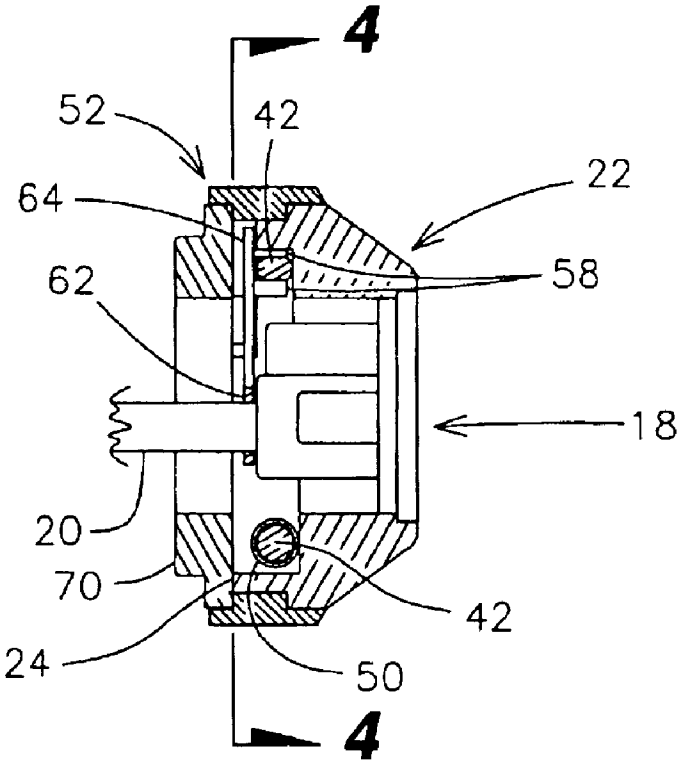
FIG. 5 is a cross sectional view along line 5—5 of the invention illustrated in FIG. 4, the device being in the deadbolt engaged position.
Figure 4:
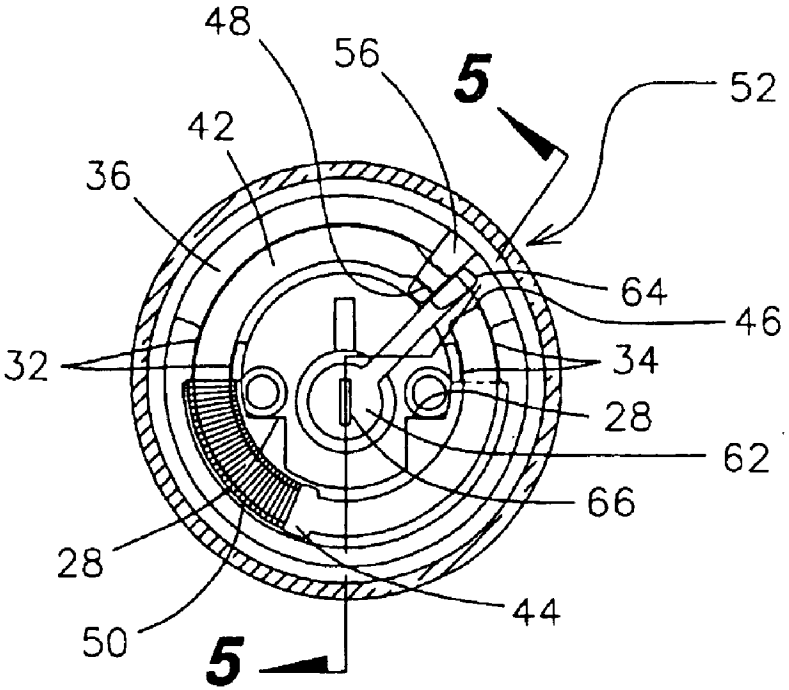
FIG. 4 is a cross sectional view along line 4—4 of the invention illustrated in FIG. 5, the device being in the deadbolt engaged position.

In order to engage the deadbolt, the user must rotate the rotatable ring 52 clockwise to overcome the bias of the spring ring 42 return spring 50 assembly, to reach the position as shown in FIGS. 4 and 5. As the rotatable ring 52 is turned, the radial finger 56 forces the radial actuator 62 to rotate the tumbler axial actuator 20, thereby projecting the deadbolt into the locked, engaged position. The radial finger 56 pulls the spring ring 42, through the interaction of catch 48 and notch 60, around a circular path. The rotation causes the spring stop 44 to compress the return spring 50. This causes the user to feel increasing resistance, or bias, through the rotatable ring 52. Rotation of the rotatable ring 52 is limited to the position shown in FIGS. 4 and 5 by shoulder groove 34, which acts as a stop for the movement of radial finger 56. Further, the user will "feel" that the tumbler mechanism 12 has projected the bolt, as is felt when using a key.

Upon release of the rotatable ring 52, the compressed return spring 50 will force the spring ring 42 to rotate counter clockwise and pull rotatable ring 52 and radial finger 56 back to the original position (shown in FIGS. 2 and 3) against shoulder groove 32. The radial actuator 62 and tumbler axial actuator 20 remain in the bolt projected position. The biasing of the radial finger 56 away from the radial actuator 62 leaves the lock in position for disengagement of the bolt by a key without any contact or resulting binding effect from the device of the present invention.

The operation of the present invention is very similar to that of a conventional deadbolt lock, whether the lock is a double cylinder lock or of the type with a thumb turn on the interior. In either lock, a key must be utilized to open or lock the door from the outside. However, the present invention allows the door to be locked from the outside without use of a key. A fractional rotation of the rotatable ring 52 projects the bolt into engagement, after which the biasing resulting from the spring ring 42/return spring 50 assembly causes the rotatable ring 52 to return to its original position.

Figure 8:
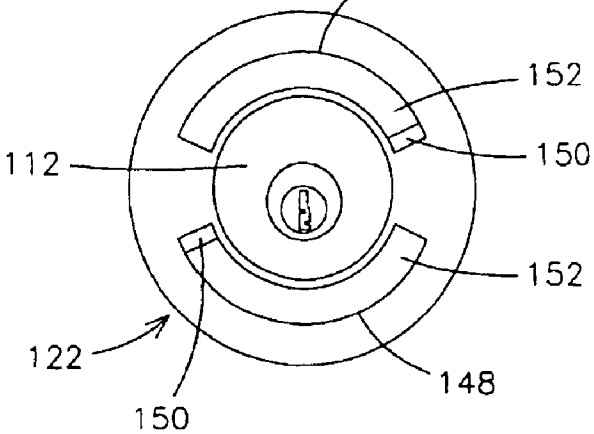
FIG. 8 is a front view of the embodiment illustrated in FIG. 6.
Figure 7:
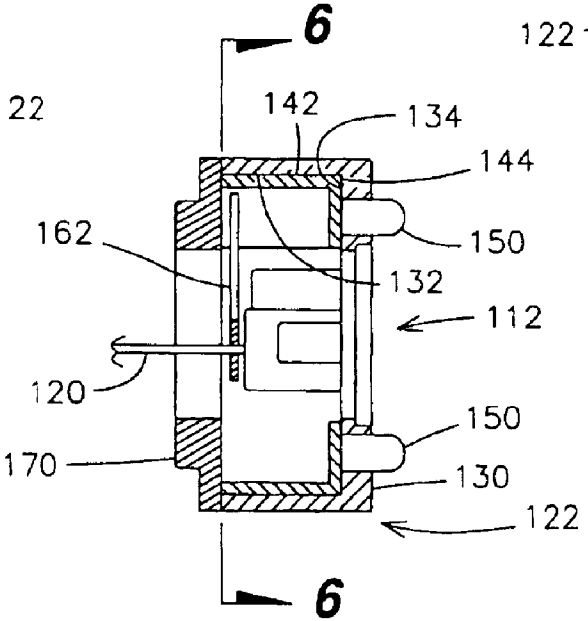
FIG. 7 is a cross sectional view along line 7—7 of the preferred embodiment illustrated in FIG. 6, in the deadbolt disengaged position. The biasing means is not illustrated.
Figure 6:
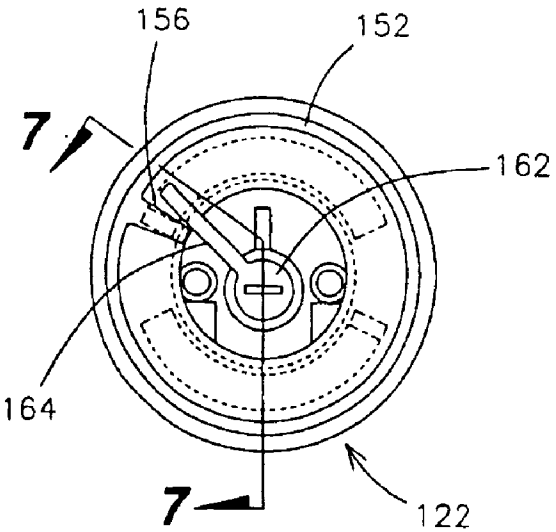
FIG. 6 is a cross sectional view along line 6—6 of another preferred embodiment of the rotatable ring :of the present invention in the deadbolt disengaged position shown in FIG. 7. The biasing means is not illustrated.
Figure 10:
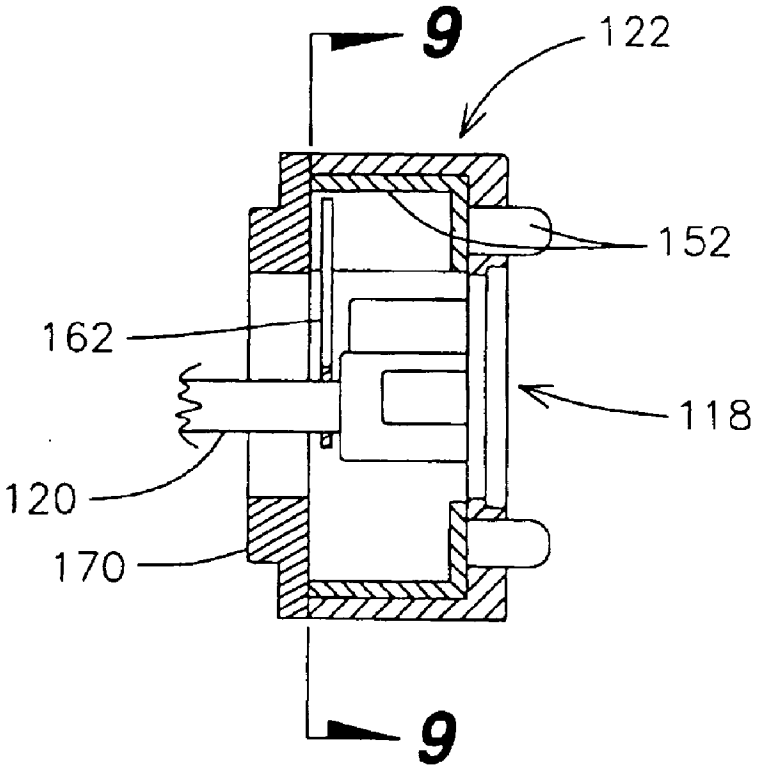
FIG. 10 is a cross sectional view along line 10—10 of the preferred embodiment illustrated in FIG. 9, in the deadbolt engaged position. The biasing means is not illustrated.
Figure 9:
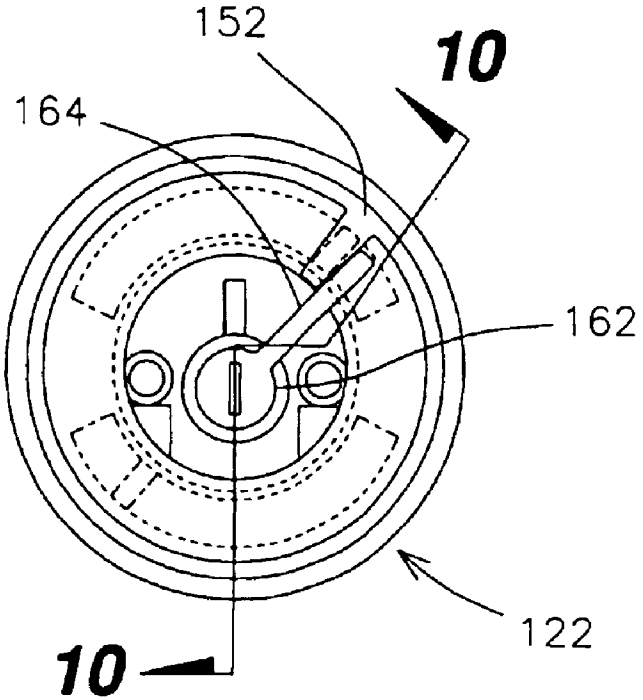
FIG. 9 is a cross sectional view along line 9—9 of the preferred embodiment illustrated in FIG. 10, in the deadbolt engaged position. The biasing means is not illustrated.

Another embodiment of the present invention is illustrated in a deadbolt disengaged position, FIGS. 6–8, and a deadbolt engaged position, FIGS. 9–10. The body 122 includes a base portion 128 and a face portion 130, the body 122 completely covering and loosely surrounding the rotatable ring 152. The inner surfaces 132, 134 of the body 122 form bearing surfaces for the outer surfaces 142, 144 of the rotatable ring 152.

The rotatable ring 152 is loosely constrained in the axial direction by the body 122 and the locator ring 170. The body 122 is clamped to and located by the locator ring 170 by two screws (not shown) in the lock tumbler assembly 112 as described for the embodiment disclosed above.

The body 122 includes two openings or apertures 146, 148 on the face portion 130, through which two "ears" or rotator projections 150 of the rotatable ring 152 extend. The user grasps the projections 150 with a thumb and forefinger and turns. The arm 164 engages radial finger 156, which is constructed and operates as disclosed above. Arm 164 and finger 156 act so as to force radial actuator 162 to engage, through axial actuator 120 of tumbler assembly 112, the deadbolt. The deadbolt remains engaged, and cannot be disengaged by movement of the rotatable ring 152.

The method of biasing to return the rotatable ring 152 is not illustrated in FIGS. 6–10 for purposes of clarity, however, any of the methods disclosed herein can be applied to this embodiment. The material and methods used to construct the various components of this embodiment are identical to those disclosed above in the first preferred embodiment.

Figure 12:
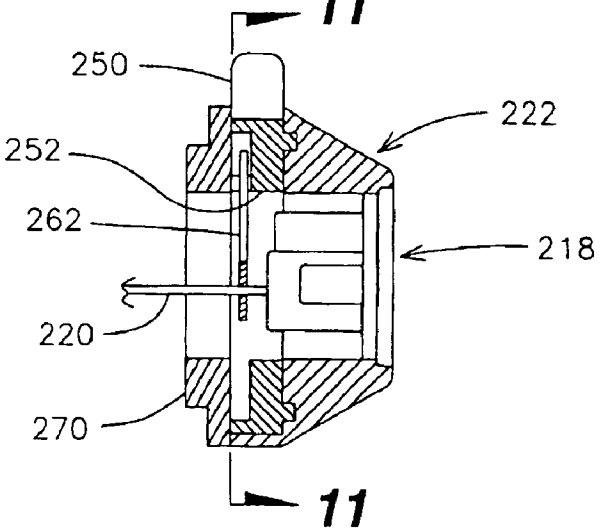
FIG. 12 is a cross sectional view along line 12—12 of the preferred embodiment illustrated in FIG. 11, in the deadbolt disengaged position. The biasing means is not illustrated.
Figure 13:
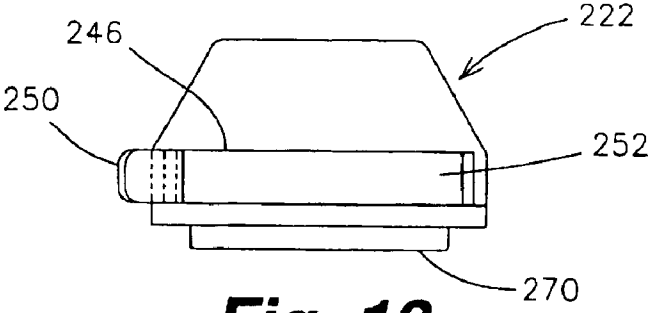
FIG. 13 is a front view of the embodiment illustrated in FIG. 11.
Figure 11:
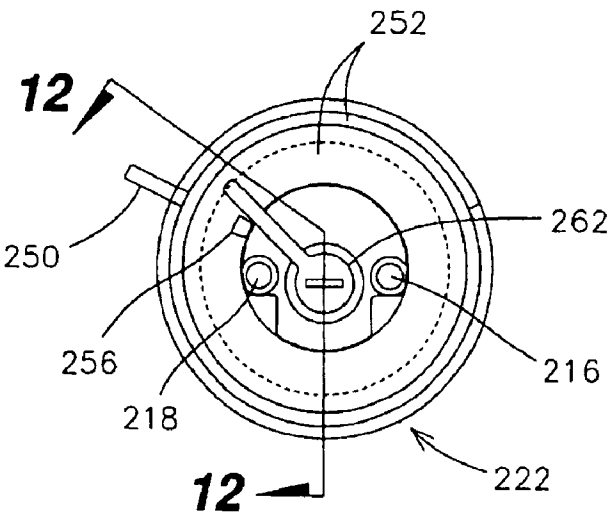
FIG. 11 is a cross sectional view along line 11—11 of another preferred embodiment of the rotatable ring of the present invention in the deadbolt disengaged position shown in FIG. 12. The biasing means is not illustrated.
Figure 15:
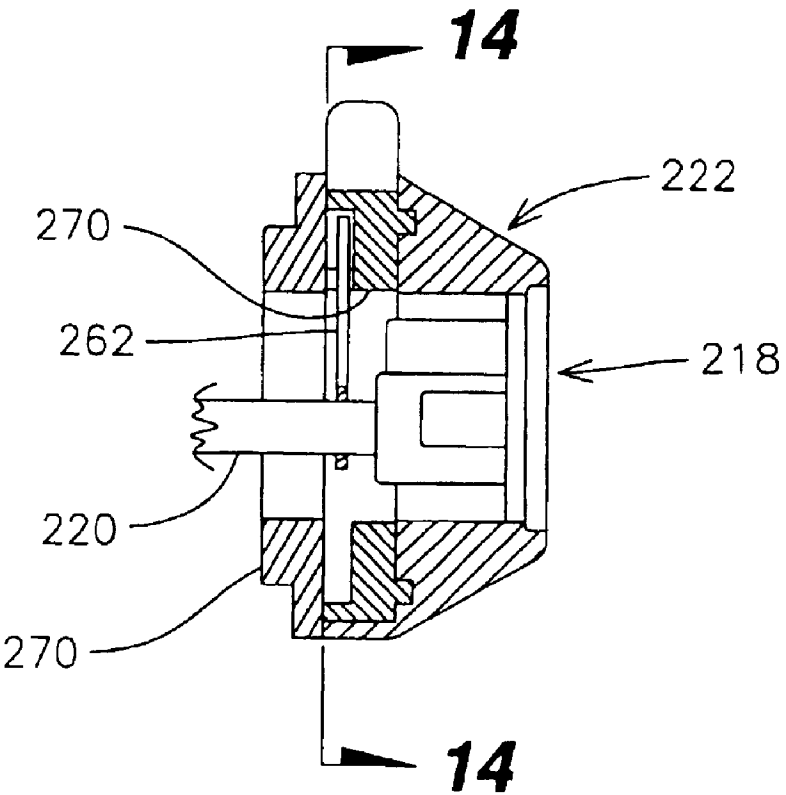
FIG. 15 is a cross sectional view along line 15—15 of the preferred embodiment illustrated in FIG. 14, in the deadbolt engaged position. The biasing means is not illustrated.
Figure 14:
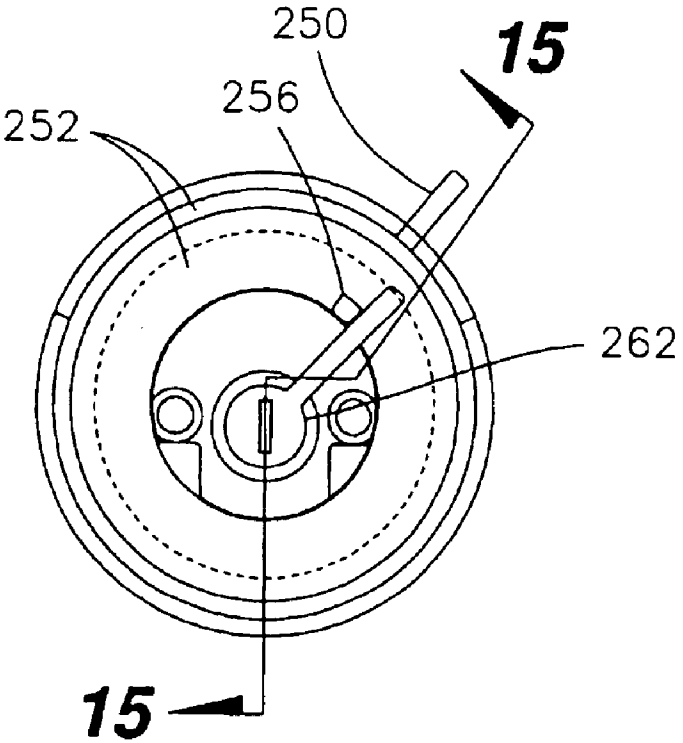
FIG. 14 is a cross sectional view along line 14—14 of the preferred embodiment illustrated in FIG. 15, in the deadbolt engaged position. The biasing means is not illustrated.

Another preferred embodiment of the present invention is illustrated in the deadbolt disengaged position in FIGS. 11–13 and in the deadbolt engaged position in FIGS. 14 and 15.

The body 222 includes a channeled shoulder portion 238 which substantially surrounds and provides bearing surfaces for rotatable ring. 252. The rotatable ring 252 is also loosely constrained in the axial direction by the body 222 and locator ring 270. The body 222 includes an opening or aperture 246 where the body 222 and the locator ring 270 join. The body 222 is clamped to and located by the locator ring by two outside screws (not shown) in the threaded holes 216, 218 of the lock tumbler 212.

The rotatable ring 252 includes an "ear" or projection 250 which extends through aperture 246, the aperture 246 limiting the movement of the projection 250 to 180 degrees or less. The user pushes the projection 250 which turns the rotatable ring 252. The radial finger 256, which is constructed and operates as disclosed above, forces radial actuator 262, in combination with the axial actuator 220, to engage the deadbolt. The deadbolt remains engaged, and cannot be disengaged by movement of the rotatable ring 252.

The method of biasing to return the rotatable ring 252 is not illustrated in FIGS. 11–15 for purposes of clarity, however, any of the methods disclosed herein can be applied to this embodiment. The material and methods used to construct the various components of this embodiment are identical to those disclosed above in the first preferred embodiment.

Figure 17:
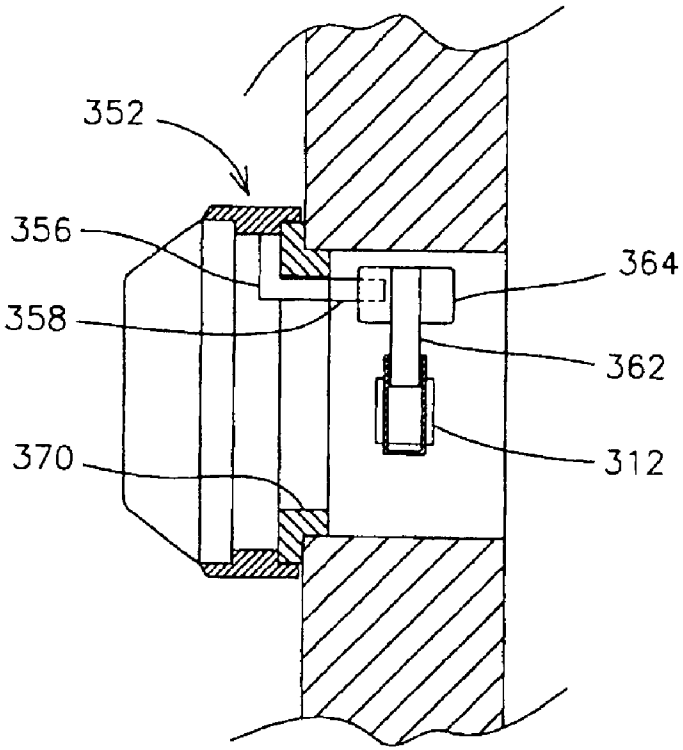
FIG. 17 is a cross sectional view along line 17—17 of the preferred embodiment illustrated in FIG. 16, in the deadbolt disengaged position. The biasing means is not illustrated.
Figure 16:
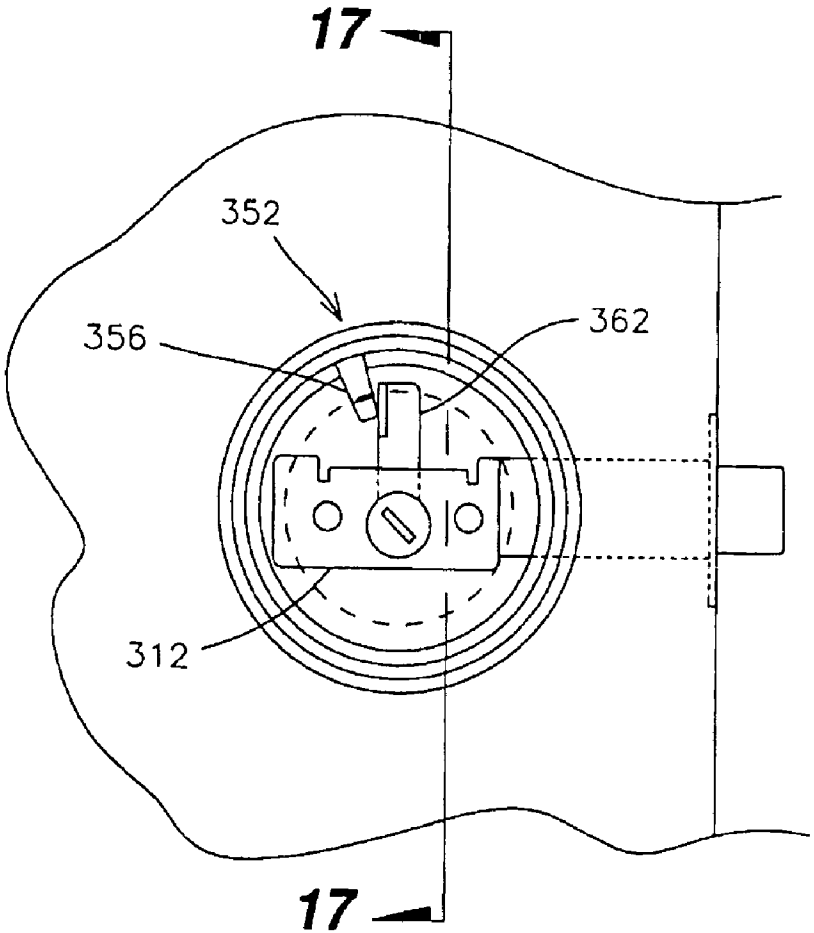
FIG. 16 is a cross sectional view of another preferred embodiment of the rotatable ring of the present invention in the deadbolt disengaged position. The biasing means is not illustrated.

Another preferred embodiment is illustrated in FIGS. 16, and 17, which shows the deadbolt in a semi-projected, half locked state. In this embodiment, the body 322 and the locator ring 370 are constructed and operate in the same manner as described for the first preferred embodiment. The radial finger 356 of rotatable ring 352 interacts with bolt actuator 362 which has a paddle shaped surface 364. The bolt actuator 362 is directly manipulated by one way contact with an axial extension 358 from the radial finger 356.

The bolt actuator 362 fits in the bolt assembly 312 and accepts axial actuator 320 as is common practice in the industry. This configuration, as well as the other embodiments described herein, is fully reversible to work with right or left handed doors.

The method of biasing to return the rotatable ring 352 is not illustrated in FIGS. 16 and 17 for purposes of clarity, however, any of the methods disclosed herein can be applied to this embodiment. The material and methods used to construct the various components of this embodiment are identical to those disclosed above in the first preferred embodiment.

Figure 18:
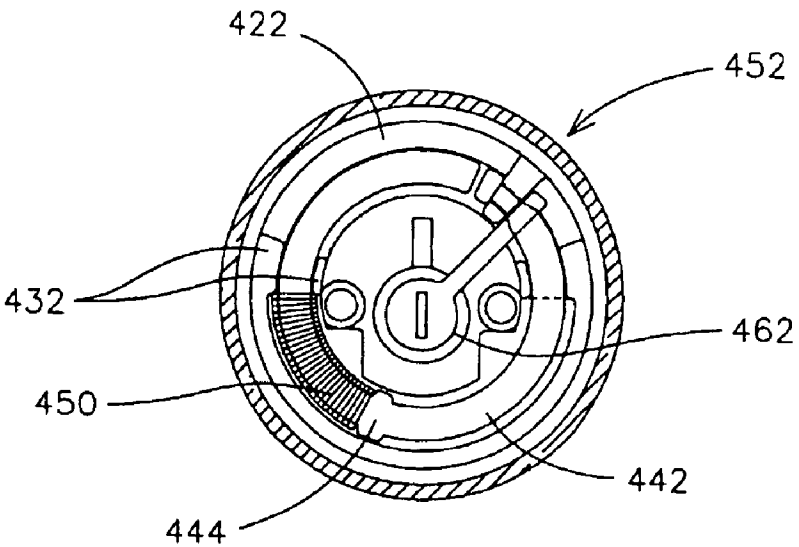
FIG. 18 is a cross sectional view of another preferred embodiment of the biasing means of the present invention.

FIG. 18 illustrates an alternative preferred embodiment for the biased rotatable ring return mechanism, the device being shown in the deadbolt engaged position. The body 422, rotatable ring 452, radial actuator 462, return spring 450, as well as the locator ring (not shown) operate as described and illustrated for the first preferred embodiment. The spring ring 442 is designed as described for the first preferred embodiment, however, the spring ring 442 is assembled within the device as follows.

The return spring 450 is fitted onto the spring ring 442, and fits and cooperates within the body 422 and rotatable ring 452 as described for the first preferred embodiment. However, the spring ring 442 is pushed by the radial finger 456 around a circular path, the rotation compressing return spring 450 between shoulder groove 432 and spring stop 444. Upon release of the rotatable ring 452, the return spring 450 rotates the rotatable ring 452 back to the original position. The deadbolt remains projected and cannot be disengaged by rotation of the rotatable ring 452. The material and methods used to construct the various components of this embodiment are identical to those disclosed above in the first preferred embodiment.

Figure 19:
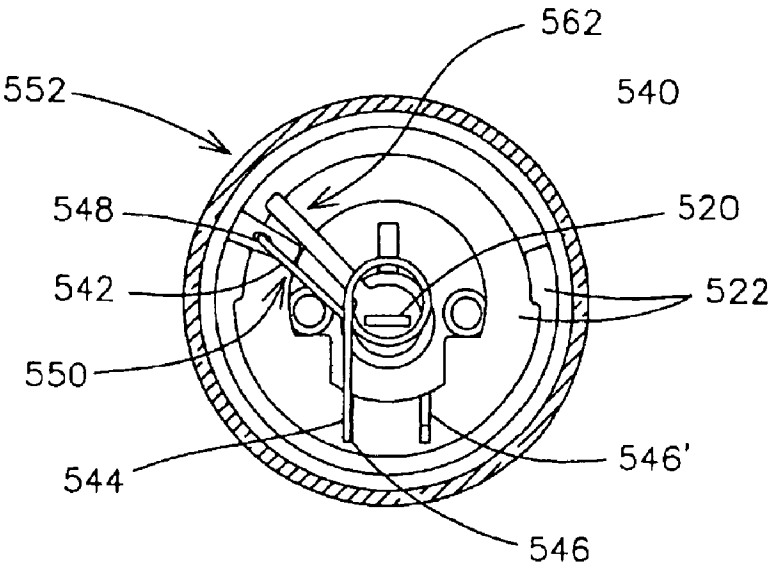
FIG. 19 is a cross sectional view of another preferred embodiment of the biasing means of the present invention.

FIG. 19 illustrates another preferred embodiment of the biased rotatable ring return mechanism. The body 522, constructed as in the first preferred embodiment, further includes a body slot 546. (Body slot 546' is provided to allow the lock to be used with either a right or left handed door.) The radial finger 558 of rotatable ring 552 includes a radial finger slot 548, and is adjacent to radial actuator 562.

The return spring 450 is a torsional type and has two elongated members 542, 544. One elongated member 544 extends down and is held in place from rotating by the body slot 546. The other elongated member 542 extends at an angle and has a means to connect into radial finger slot 548. The two elongated members 542, 544 join at a coiled member 540 that is generally held around axial actuator 520. When the rotatable ring 552 is rotated to project the bolt, the radial finger slot 548 forces one elongated member 542 of return spring 550 to rotate and provide a torsional counter force while the other elongated member 544 remains stationery.

Upon release of the rotatable ring 552, the return spring 550 rotates the rotatable ring 552 back to the original position. The deadbolt remains projected and cannot be disengaged by rotation of the rotatable ring 552. The material and methods used to construct the various components of this embodiment are identical to those disclosed above in the first preferred embodiment.

Figure 20:
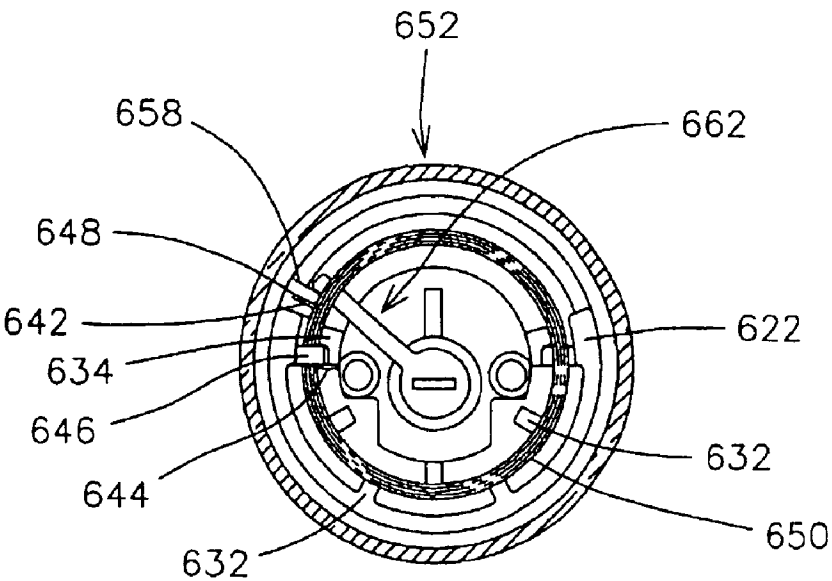
FIG. 20 is a cross sectional view of another preferred embodiment of the biasing means of the present invention.

FIG. 20 illustrates an alternative embodiment of the biased rotatable ring return mechanism. The device is shown in the deadbolt retracted, disengaged state. The rotatable ring 652 is constructed substantially around and in cooperating relation to the body 622 in the same way as described for the first preferred embodiment. The rotatable ring 652 includes a radial finger 658 extending inward and being adjacent to radial actuator 662, the radial finger 658 having a radial finger slot 648. The return spring 650 is of the coiled constant force type, as is known in the art is wound to a tension proper for the particular application. A spring wind retainer 646 is provided and has a means to wrap around a portion of the return spring 650 where tangs 642, 644 protrude to prevent it from unwinding. This allows removal and reinsertion into the body 622 without loss of tension, easily accommodating right and left handed doors.

Location blocks 632 are provided to locate, guide and support the return spring 650 into body 622. Tang 642 is located in contact with location block 634 and tang 642 fits immovably into radial finger slot 648. When rotatable ring 652 is rotated to engage the bolt, tang 642 is pulled in a circular direction with a constant force until the bolt is projected.

Upon release of the rotatable ring 652, the return spring 650 rotates the rotatable ring 652 back to the original position. The deadbolt remains projected and cannot be disengaged by rotation of the rotatable ring 652. The material and methods used to construct the various components of this embodiment are identical to those disclosed above in the first preferred embodiment.

Figure 21:
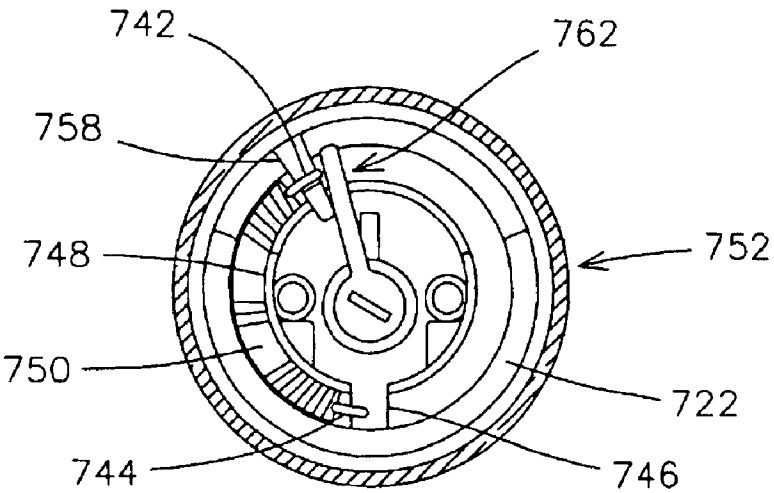
FIG. 21 is a cross sectional view of another preferred embodiment of the biasing means of the present invention.

FIG. 21 illustrates an alternative embodiment of the biased rotatable ring return mechanism, the device being shown with the deadbolt in a semi-projected position. The rotatable ring 752 is constructed substantially around and in cooperating relation to the body 722 in the same way as described for the first preferred embodiment. The rotatable ring 752 includes a radial finger 758 extending inward in contact with radial actuator 762.

A return spring 750 is of the coiled extension type with end loops 742, 744, as is known to those skilled in the art. Loop 742 of the return spring 750 is connected and held by a means around radial finger 758. The other loop 744 is held in place by slot 746. The coils of the return spring are held against and ride around a circular path on slide 748 by the tension of the return spring 750. The slide 748 may be an integral part of body 722 or can be an additional part made of plastic, metal or any suitable material. The slide 748 could be held rigidly or loosely within the body in a slot or by other means.

When rotating the rotatable ring 752 to project the bolt, the radial finger 758 elongates return spring 750 with increasing tension until the bolt is projected. Upon release of the rotatable ring 752, the return spring 750 pulls the rotatable ring 752 around to the original position. As in the other embodiments, this embodiment can be reversed for use with either right or left handed doors.

The material and methods used to construct the various components of this embodiment are identical to those disclosed above in the first preferred embodiment.

From the foregoing description those skilled in the art will appreciate that all of the objects of the present invention are realized.

The rotatable ring adds material thickness around the periphery of the device to greatly hinder efforts to access the mechanism by drilling. Further, the construction of the rotatable ring radial finger resists tampering of a twisting type, as the radial finger would tend to deform or break off, leaving the rotatable ring useless, as it would spin freely about the device and lock mechanism. In addition, the rotatable ring provides a moisture barrier which prevents corrosion or freezing of the assembly.

The device of the present invention further provides a spring ring/return spring assembly which functions to return the rotatable ring to its original resting position after the deadbolt is engaged. Returning the rotatable ring to its original position prevents any binding of the lock mechanism, as the radial finger is no longer in any contact with the radial actuator.

Any contact between the radial ringer and radial actuator would cause considerable binding of the radial finger along the extending arm. This is due to the offset rotation points of these two compenents. The radial actuator rotates about an axis considerably lower than the axis of rotation of the rotatable ring. The mechanical advantage gained by the radial finger from the rotatable ring acting on the extending arm makes this movement unnoticeable when projecting the bolt. If there is contact between the radial finger and the extending arm when a key is used to retract the bolt, then the great mechanical disadvantage from the key to this contact point makes the binding very pronounced and detrimental to the unlocking attempt.

Upon using a key to disengage the deadbolt, the lock will "behave" exactly as if the device of the present invention were not being used.

There is provided a body which houses and protects the lock tumbler. Additionally, the body houses and guides the movement of the spring ring/return spring assembly, and the radial actuator. The body provides bearing surfaces for the rotatable ring to ride on, and further inhibits lateral and axial motion of the rotatable ring. The thickness of the body makes it extremely difficult to drill through, and the profile of the body resists grasping the device with a wrench or other tool, thereby increasing security.

While specific embodiments have been shown and described, many variations are possible. The body, rotatable and locator rings may be constructed of any ferrous or non-ferrous metal, plastic, ceramic, composite or any other appropriately solid and strong material. These rings may be produced by other methods including other types of casting, injection molding, machining or any other appropriate method.

The spring ring can be constructed of another plastic material, or any of the materials and by any of the processes listed above. The radial actuator may be constructed of sheet steel by die cutting, laser cutting or other method, but may also be of a plastic material by injection or other molding, or any of the materials and by any of the processes listed above.

The return spring can be made of music wire, stainless steel or any other spring material and can be used in plated or unplated form.

While a preferred spring ring/return spring assembly has been illustrated to provide a means to return the rotatable ring to its original position, several modifications may be made. The spring ring could be constructed as only a partial circle of a cross section and fit inside the return spring. The spring ring could also be held rigidly or loosely by some other portion of the rotatable ring, or some portion of the base ring.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A keyless deadbolt lock engaging apparatus for use with a conventional deadbolt assembly, the apparatus comprising:

an actuator means to engage the deadbolt assembly;

a rotatable ring assembled with and capable of rotating against one or bearing surfaces of a body, said rotatable ring capable of rotating from a first position in which the actuator means is in a deadbolt disengaged position to a second position in which the actuator means is in a deadbolt engaged position; and a biasing means connected with said rotatable ring to return the rotatable ring from the second position to the first position while the actuator means remains in the deadbolt engaged position; said actuator means, rotatable ring, and body attached with said conventional deadbolt assembly.

2. The keyless deadbolt lock engaging apparatus of claim 1 wherein the biasing means is a spring mechanism.

3. The keyless deadbolt lock engaging apparatus of claim 1 wherein the biasing means includes a torsional type spring.

4. The keyless deadbolt lock engaging apparatus of claim 1 wherein the biasing means includes a coiled constant force type spring.

5. The keyless deadbolt lock engaging apparatus of claim 1 wherein the biasing means includes a coiled extension type having end loops.

6. The keyless deadbolt lock engaging apparatus of claim 1 wherein the biasing means includes a helical coiled compression spring.

7. The keyless deadbolt lock engaging apparatus of claim 1 wherein the actuator means is a radial actuator.

8. The keyless deadbolt lock engaging apparatus of claim 1 wherein the actuator means is a paddle actuator.

9. The keyless deadbolt lock engaging apparatus of claim 1 wherein the rotatable ring has a radial finger; and said biasing means has a first end connected with said radial finger and a second end connected with said body.

10. The keyless deadbolt lock engaging apparatus for use with a conventional deadbolt lock assembly, the lock assembly having an axial actuator, the apparatus comprising:

a body having a center aperture through which the lock assembly is located, the lock assembly being secured to the body;

a locator ring to secure the apparatus to a door fitted with the conventional deadbolt lock assembly;

a radial actuator to engage the deadbolt assembly, the radial actuator including an arm extension and a center aperture through which the deadbolt lock assembly axial actuator is located;

a rotatable ring capable of rotating from a first position in which the actuator means is in a deadbolt disengaged position to a second position in which the actuator means is in a deadbolt engaged position; and a biasing means connected with said rotatable ring to return the rotatable ring from the second position to the first position while the radial actuator remains in the deadbolt engaged position.

11. The keyless deadbolt lock engaging apparatus of claim 10 wherein the biasing means is a spring mechanism.

12. The keyless deadbolt lock engaging apparatus of claim 10 wherein the biasing means includes a torsional type spring.

13. The keyless deadbolt lock engaging apparatus of claim 10 wherein the biasing means includes a coiled constant force type spring.

14. The keyless deadbolt lock engaging apparatus of claim 10 wherein the biasing means includes a coiled extension type having end loops.

15. The keyless deadbolt lock engaging apparatus of claim 10 wherein the biasing means includes a helical coiled compression spring.

16. The keyless deadbolt lock engaging apparatus for use in combination with a conventional deadbolt lock tumbler assembly having an axial actuator, the apparatus comprising:

a locator ring to secure the apparatus to a door to be fitted with the conventional deadbolt lock assembly;

a body to substantially house the lock assembly;

a rotatable ring, the rotatable ring including a radial finger;

a return spring mechanism connected with said radial finger of said rotatable ring; and a radial actuator having a projecting arm, the arm being located adjacent to and moveable by the rotatable ring radial finger, the radial actuator further including a center aperture through which the lock tumbler axial actuator is located;

whereby upon turning the rotatable ring from a first position to a second position the radial finger pushes the radial actuator from a deadbolt disengaged position to a deadbolt engaged position, and further whereby upon release of the rotatable ring the return spring mechanism causes the rotatable ring to rotate back to the first position while allowing the radial actuator to remain in the deadbolt engaged position.

17. The keyless deadbolt lock engaging apparatus of claim 16 herein the locator ring further includes a projection having an outer shoulder projection of decreased diameter;

wherein the body includes a channel portion, the channel portion including shoulder grooves, the body further including step projections extending into the center of the body, the step projections preventing the body from rotating about the tumbler assembly, the portion of the body adjacent the locator ring being a shoulder of a decreased diameter, the body shoulder and locator ring shoulder forming a radial channel;

wherein the rotatable ring is located within and is rotatable about the radial channel formed by the body and locator ring, the rotatable ring including a radial finger extending inward, the radial finger having a notch;

wherein the return spring mechanism includes a spring ring including a spring stop, a grooved portion and an end stop, the spring ring being located within the body channel, the grooved portion being located within the rotatable ring finger notch; and a return helical coiled compression return spring coiled about the spring ring, the return spring being located between the spring ring spring stop and the body shoulder groove;

whereby upon turning the rotatable ring from an original position the radial finger pushes the radial actuator from a deadbolt disengaged position to a deadbolt engaged position, the radial finger further pushing the spring ring by the grooved portion thereby causing the return spring to be compressed between the body shoulder groove and the spring ring spring stop, and further whereby upon release of the rotatable ring the return spring causes the rotatable ring to rotate back to the original position while allowing the radial actuator to remain in the deadbolt engaged position.

18. The keyless deadbolt lock engaging apparatus of claim 16 wherein the body includes a body slot;

the rotatable ring radial finger includes a radial finger slot;

the spring mechanism includes a torsional type spring having a first and a second elongated member being joined at a coiled member, the first elongated member being connected to the radial finger slot, the second elongated member being connected to the body slot;

whereby upon turning the rotatable ring from an original position pushes the radial actuator from a deadbolt disengaged position to a deadbolt engaged position, the radial finger further pulling the first elongated member as the second elongated member remains connected to the body slot to increase the torsional force on the coiled member, and further whereby upon release of the rotatable ring the coiled member forces the rotatable ring back to the original position through the first elongated member while allowing the radial actuator to remain in the deadbolt engaged position.

19. The keyless deadbolt lock engaging apparatus of claim 16 wherein the body includes a body slot;

the rotatable ring radial finger includes a radial finger slot;

the spring mechanism includes a coiled constant force type spring having a first and a second spring end, the first spring end being connected to the radial finger slot, the second spring end being connected to the body slot;

whereby upon turning the rotatable ring from an original position pushes the radial actuator from a deadbolt disengaged position to a deadbolt engaged position, the radial finger further pulling the first spring end as the second spring end remains connected to the body slot to increase the torsional force on the spring, and further whereby upon release of the rotatable ring the spring forces the rotatable; ring back to the original position through the first spring end allowing the radial actuator to remain in the deadbolt engaged position.

20. The keyless deadbolt lock engaging apparatus of claim 16 wherein body includes a body slot;

the rotatable ring radial finger includes a radial finger slot;

the spring mechanism includes a coiled extension type spring having a first and a second end loop, the first end loop being connected to the radial finger slot, the second end loop being connected to the body slot;

whereby upon turning the rotatable ring from an original position pushes the radial actuator from a deadbolt disengaged position to a deadbolt engaged position, the radial finger further pulling the first end loop as the second end loop remains connected to the body slot to increase the tension on the spring, and further whereby upon release of the rotatable ring the spring forces the rotatable ring back to the original position through the first end loop allowing the radial actuator to remain in the deadbolt engaged position.

21. The keyless deadbolt lock engaging apparatus of claim 16 wherein the locator ring further includes a projection having an outer shoulder projection of decreased diameter;

wherein the body includes a channel portion, the channel portion including shoulder grooves, the body further including step projections extending into the center of the body, the step projections preventing the body from rotating about the tumbler assembly, the portion of the body adjacent the locator ring being a shoulder of a decreased diameter, the body shoulder and locator ring shoulder forming a radial channel;

wherein the rotatable ring is located within and is rotatable about the radial channel formed by the body and locator ring, the rotatable ring including a radial finger extending inward, the radial finger having a notch;

wherein the return spring mechanism includes a spring ring including a spring stop, a grooved portion and an end stop, the spring ring being located within the body channel, the grooved portion being located within the rotatable ring finger notch, and a return helical coiled compression return spring coiled about the spring ring, the return spring being located between the spring ring spring step and the body shoulder groove, whereby upon turning the rotatable ring from an original position the radial finger pushes the radial actuator from a deadbolt disengaged position to a deadbolt engaged position, the radial finger further pulling the spring ring by the grooved portion thereby causing the return spring to be compressed between the body shoulder groove and the spring ring spring stop, and further whereby upon release of the rotatable ring the return spring causes the rotatable ring to rotate back to the original position while allowing the radial actuator to remain in the deadbolt engaged position.

22. The keyless deadbolt lock engaging apparatus of claim 16 wherein the body includes a base portion and a face portion, thereby forming an L-shaped cross-sectional lock assembly housing, the face portion including at lease one semi-circular aperture;

the rotatable ring has a base portion and a face portion thereby forming an L-shaped crosssection sized to rotate within and against the body base portion and the body face portions, the rotatable ring further including at lease one rotator projection extending from the face portion of the rotatable ring through the semi-circular aperture of the face portion of the body, whereby the rotatable ring is encased by the body, but can be rotated from the exterior of the apparatus.

23. The keyless deadbolt lock engaging apparatus of claim 16 wherein the body includes a channeled shoulder portion along the body center aperture, the body further including an outer aperture of about 180 degrees or less; and the rotatable ring is fitted to rotate within and against the body shoulder, the rotatable ring further including a rotator projection extending from the rotatable ring through the outer aperture, whereby the rotatable ring is encased by the body, but can be rotated from the exterior of the apparatus.

24. The keyless deadbolt lock engaging apparatus of claim 16 wherein the radial actuator is a bolt actuator having a paddle shaped surface;

whereby the rotatable ring radial finger pushes against the paddle surface to engage the deadbolt.

25. A keyless deadbolt lock engaging apparatus for use in combination with a conventional deadbolt lock tumbler assembly having an axial actuator, the apparatus comprising:

a locator ring to secure the apparatus to a door fitted with the conventional deadbolt lock assembly, the ring including a projection having an outer shoulder projection of decreased diameter;

a body including a channel portion, the channel portion including shoulder grooves, the body further including step projections extending into the center of the body, the step projections preventing the body from rotating about the tumbler assembly, the portion of the body adjacent the locator ring being a shoulder of a decreased diameter, the body shoulder and locator ring shoulder forming a radial channel;

a rotatable ring located within and being rotatable about the radial channel formed by the body and locator ring, the rotatable ring including a radial finger extending inward, the radial finger having a notch;

a spring ring including a spring stop, a grooved portion and an end stop, the spring ring being located within the body channel, the grooved portion being located within the rotatable ring finger notch;

a return helical coiled compression return spring coiled about the spring ring, the spring being located between the spring ring spring stop and the body channel shoulder; and a radial actuator having a projecting arm, the arm being located adjacent to and moveable by the rotatable ring finger, the radial actuator further including a center aperture through which the tumbler actuator is located;

whereby upon turning the rotatable ring from an original position the radial finger pushes the radial actuator from a deadbolt disengaged position to a deadbolt engaged position, the radial finger further pulling the spring ring by the grooved portion thereby causing the return spring to be compressed between the body shoulder groove and the spring ring spring stop, and further whereby release of the rotatable ring the return spring causes the rotatable ring to rotate back to the original position while allowing the radial actuator to remain in the deadbolt engaged position.

*26. A keyless deadbolt lock engaging apparatus for use with a deadbolt assembly, the apparatus comprising:*

*an actuator to engage the deadbolt assembly;*

*a rotatable ring capable of rotating from a first position in which the actuator is in a deadbolt disengaged position to a second position in which the actuator is in a deadbolt engaged position;*

*a body having at least one bearing surface, the ring being rotatable relative to the body and against said at least one bearing surface upon rotation of the ring between its first and second positions; and*

*a biasing member operatively connected to the rotatable ring and free from operative connection to the actuator to return the rotatable ring from its second position to its first position while the actuator remains in the deadbolt engaged position.*

*27. The apparatus set forth in claim 26 wherein the biasing member is connected to the ring.*

*28. A keyless deadbolt lock engaging apparatus for use with a deadbolt assembly, the apparatus comprising:*

*an actuator to engage the deadbolt assembly;*

*a ring rotatable between a first position of the ring and a second position thereof, the ring and actuator being arranged relative to each other such that upon rotation of the ring from its first position to its second position the ring operatively engages the actuator to move the actuator from a deadbolt disengaged position to a deadbolt engaged position; and*

*a biasing member operatively connected to the rotatable ring and free from operative connection to the actuator to return the rotatable ring from its second position to its first position while the actuator remains in the deadbolt engaged position.*

*29. The apparatus set forth in claim 28 further comprising a body for supporting the ring, said body having at least one bearing surface, the ring being rotatable relative to the body and against said at least one bearing surface upon rotation of the ring between its first and second positions.*

*30. A keyless deadbolt lock engaging apparatus for a deadbolt assembly, said deadbolt assembly being mountable on a door and having a deadbolt for locking the door, said deadbolt assembly being selectively moveable between a disengaged position in which the door is not locked by the deadbolt and an engaged position in which the door is locked by the deadbolt, said apparatus comprising:*

*an actuator operatively connected to the deadbolt assembly for conjoint movement therewith, said actuator being positionable between a first position corresponding to the disengaged position of the deadbolt assembly and a second position corresponding to the engaged position of the deadbolt assembly;*

*a rotating member rotatable between a first angular position and a second angular position of the rotating member, said rotating member being configured and arranged for operatively engaging the actuator upon rotation of the rotating member from its first angular position to its second angular position to move said*

*actuator from its first position corresponding to the disengaged position of the deadbolt assembly to said second position of the actuator corresponding to the engaged position of the deadbolt assembly; and*

*a biasing member operatively connected to the rotating member and free from operative connection to the actuator for biasing the rotating member toward its first angular position away from operative engagement with the actuator in the second position of said actuator corresponding to the engaged position of the deadbolt assembly.*

*31. The apparatus set forth in claim 30 wherein the rotating member is accessible for digitally manipulating the rotating member to rotate from its first position to its second position.*

*32. The apparatus set forth in claim 31 wherein the actuator is shielded at least in part by the rotating member against digital manipulation between the first and second positions of the actuator.*

*33. A keyless deadbolt lock engaging apparatus for use with a deadbolt assembly, the apparatus comprising:*

*an actuator operatively connected to the deadbolt assembly for conjoint movement therewith, said actuator being positionable between a first position corresponding to the disengaged position of the deadbolt assembly and a second position corresponding to the engaged position of the deadbolt assembly;*

*a rotating member rotatable between a first angular position and a second angular position of the rotating member, said rotating member being configured and arranged for operatively engaging the actuator upon rotation of the rotating member from its first angular position to its second angular position to move said actuator from its first position corresponding to the disengaged position of the deadbolt assembly to said second position of the actuator corresponding to the engaged position of the deadbolt assembly;*

*a stationary component capable of assembly together with the actuator and rotating member, the rotating member being rotatable between its first and second angular positions relative to said stationary component, the stationary component remaining stationary upon rotation of the rotating member; and*

*a biasing member operatively connected to the rotating member and to the stationary component, the biasing member being configured in the second angular position of the rotating member to urge the rotating member to rotate relative to the stationary member from the second angular position of the rotating member back to its first angular position while the actuator remains in its second position corresponding to the engaged position of the deadbolt assembly.*

*34. The apparatus set forth in claim 26 wherein the biasing member comprises a spring operatively connected to the rotatable ring and to a stationary member of said apparatus, said spring being configured in the second position of the rotatable ring to urge the ring to rotate relative to the stationary member from the second position of the rotatable ring back to first position.*

*35. The apparatus set forth in claim 34 wherein the stationary member is connected to the ring.*

*36. The apparatus set forth in claim 26 wherein the biasing member comprises a spring.*

*37. The apparatus set forth in claim 28 wherein the biasing member comprises a spring.*

* * * * *